W. J. McMASTER.

Improvement in Whiffletree Clip.

No. 121,393.                                    Patented Nov. 28, 1871.

Witnesses:                                   Inventor:
Gustave Dieterich                        W. J. McMaster
Francis McArdle                          Per Munn & Co.
                                                              Attorneys.

UNITED STATES PATENT OFFICE.

WILLIAM JOHN McMASTER, OF DIXMONT, PENNSYLVANIA.

IMPROVEMENT IN WHIFFLETREE-CLIPS.

Specification forming part of Letters Patent No. 121,393, dated November 28, 1871.

*To all whom it may concern:*

Be it known that I, WILLIAM JOHN McMASTER, of Dixmont, in the county of Allegheny and State of Pennsylvania, have invented a new and useful Improvement in Whiffletree-Clip; and I do hereby declare that the following is a full, clear, and exact description thereof, which will enable others skilled in the art to make and use the same, reference being had to the accompanying drawing forming part of this specification.

Figure 1:
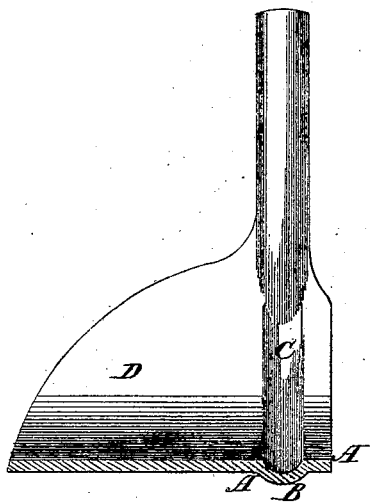
Figure 2:
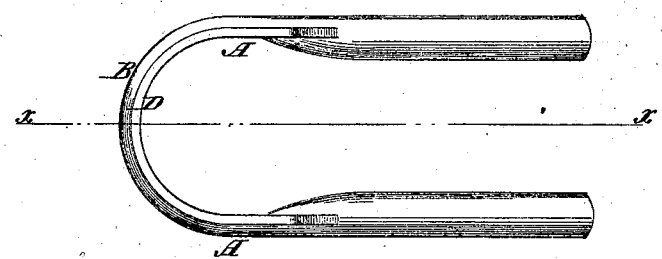

Figure 1 is a detail sectional view of my improved clip taken through the line $x\ x$, Fig. 2, showing it ready to be fitted to the whiffletree. Fig. 2 is a side view of the same.

Similar letters of reference indicate corresponding parts.

My invention has for its object to furnish improved whiffletree-clips which shall be stronger, better, and less liable to come off the whiffletree than clips made in the ordinary manner; and it consists in the clip constructed with a rib upon its outside, a groove upon its inside, and a wing or flange upon one or both of its side edges, as hereinafter more fully described.

A is the body of the clip, upon the outer surface of which is formed a rib, B. Upon the inner surface of the body A is formed a corresponding groove, C, into which the wood of the whiffletree sits, and which thus keeps it from being drawn off. Upon one or both of the side edges of the body A is formed a wing or flange, D, which gives the clip a wider bearing upon the whiffletree and thus makes it stronger and more effective.

When the clip is used for the end of a whiffletree only one wing or flange D need be used; but when the clip is used for the middle part of the whiffletree a wing or flange should be used upon each side of the body A.

Having thus described my invention, I claim as new and desire to secure by Letters Patent—

An improved whiffletree-clip having a rib, B, formed upon the outer surface and a groove, C, upon the inner surface of its body A, and a wing or flange, D, upon one or both its side edges, substantially as herein shown and described, and for the purpose set forth.

WILLIAM JNO. McMASTER.

Witnesses:
  A. EGGERS,
  S. C. McMASTER. (31)